(12) United States Patent
Albrecht et al.

(10) Patent No.: US 6,791,774 B1
(45) Date of Patent: Sep. 14, 2004

(54) CONTACT MAGNETIC TRANSFER OF SERVO PATTERN TO RIGID PERPENDICULAR MAGNETIC RECORDING DISK

(75) Inventors: Thomas R. Albrecht, Alte Landstrasse (CH); Zvonimir Z. Bandic, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 10/436,932

(22) Filed: May 12, 2003

(51) Int. Cl.$^7$ ................................................ G11B 5/86
(52) U.S. Cl. ........................................ 360/17; 360/75
(58) Field of Search ............................ 360/15, 16, 17, 360/75

(56) References Cited

U.S. PATENT DOCUMENTS

| | | | |
|---|---|---|---|
| 3,869,711 A | | 3/1975 | Bernard et al. |
| 6,469,848 B1 | * | 10/2002 | Hamada et al. ................ 360/17 |
| 6,650,490 B2 | * | 11/2003 | Nishikawa .................... 360/17 |

OTHER PUBLICATIONS

Ishida T. et al. "Magnetic Printing Technology–Application HDD", TMRC 2002, Paper A6, The 13th Magnetic Recording Conference, Aug. 26–28th, 2002, Santa Clara, CA.

* cited by examiner

Primary Examiner—David Hudspeth
Assistant Examiner—Natalia Figueroa
(74) Attorney, Agent, or Firm—Thomas R. Berthold

(57) ABSTRACT

A contact magnetic transfer method forms a pattern of magnetized servo regions in the magnetic recording layer of a rigid perpendicular magnetic recording disk. A master disk or template has a rigid or flexible base with a first film of soft magnetic material on the base and a pattern of islands of soft magnetic material on and extending above the first film and recesses between the islands. The slave disk to be servo patterned is either DC magnetized in a first direction perpendicular to the plane of the recording layer or AC-erased. The slave disk is then placed with its outer layer in proximity to the islands of the master template and a magnetic field is applied in a perpendicular direction to magnetize the regions beneath the islands in the same direction as the applied field. In the regions of the recording layer beneath the recesses of the template the magnetization is reversed from that in the regions beneath the islands.

31 Claims, 7 Drawing Sheets

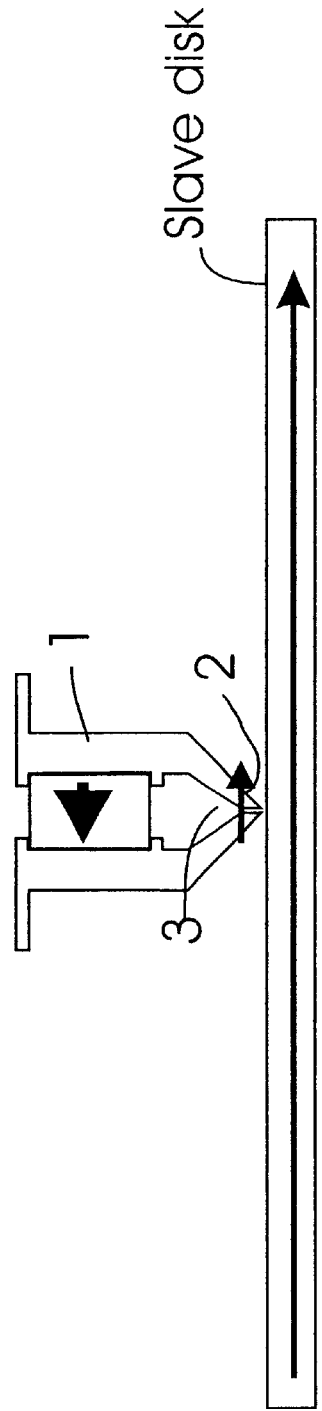
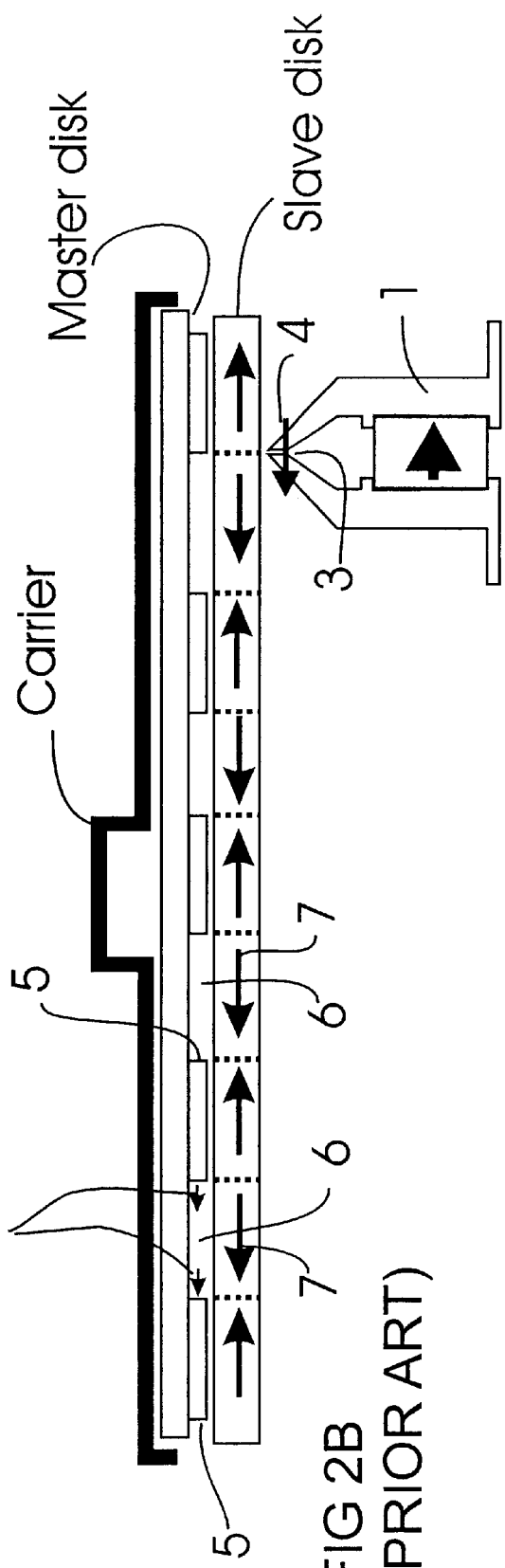
FIG 2A (PRIOR ART)
FIG 2B (PRIOR ART)

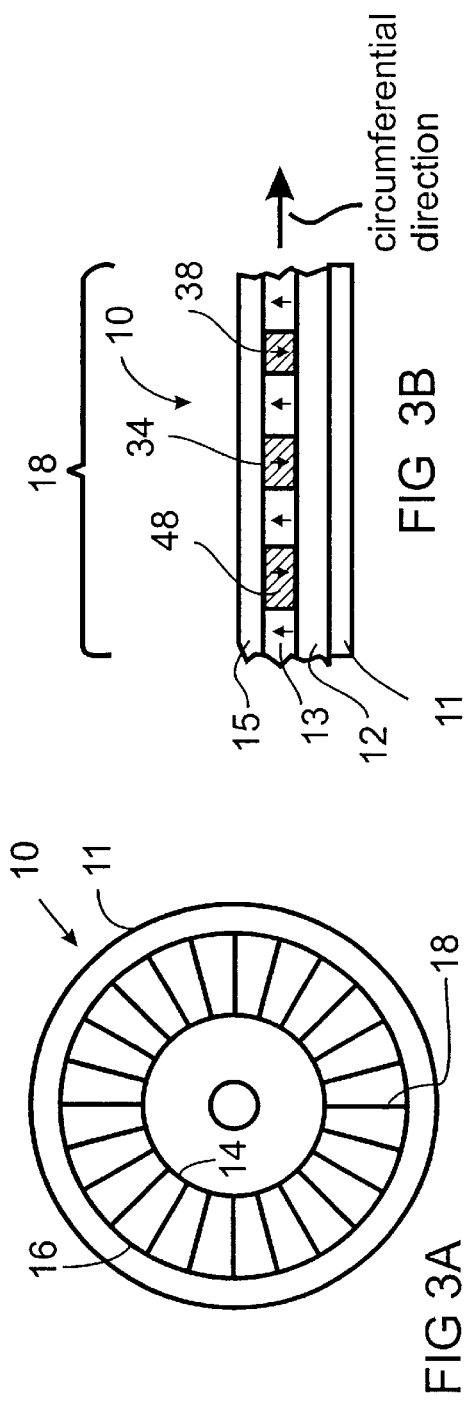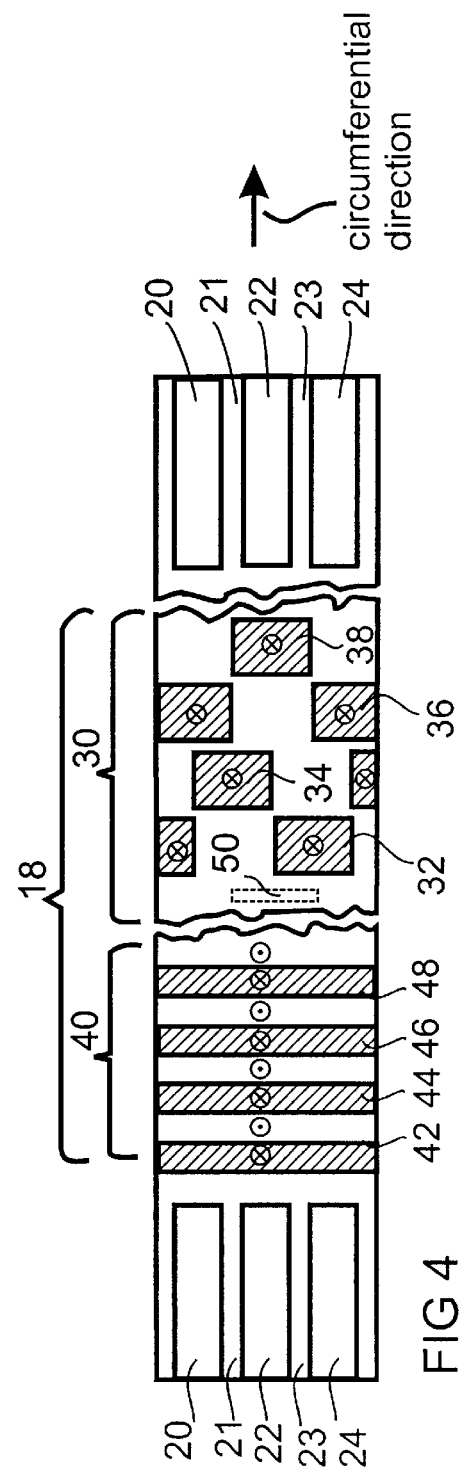

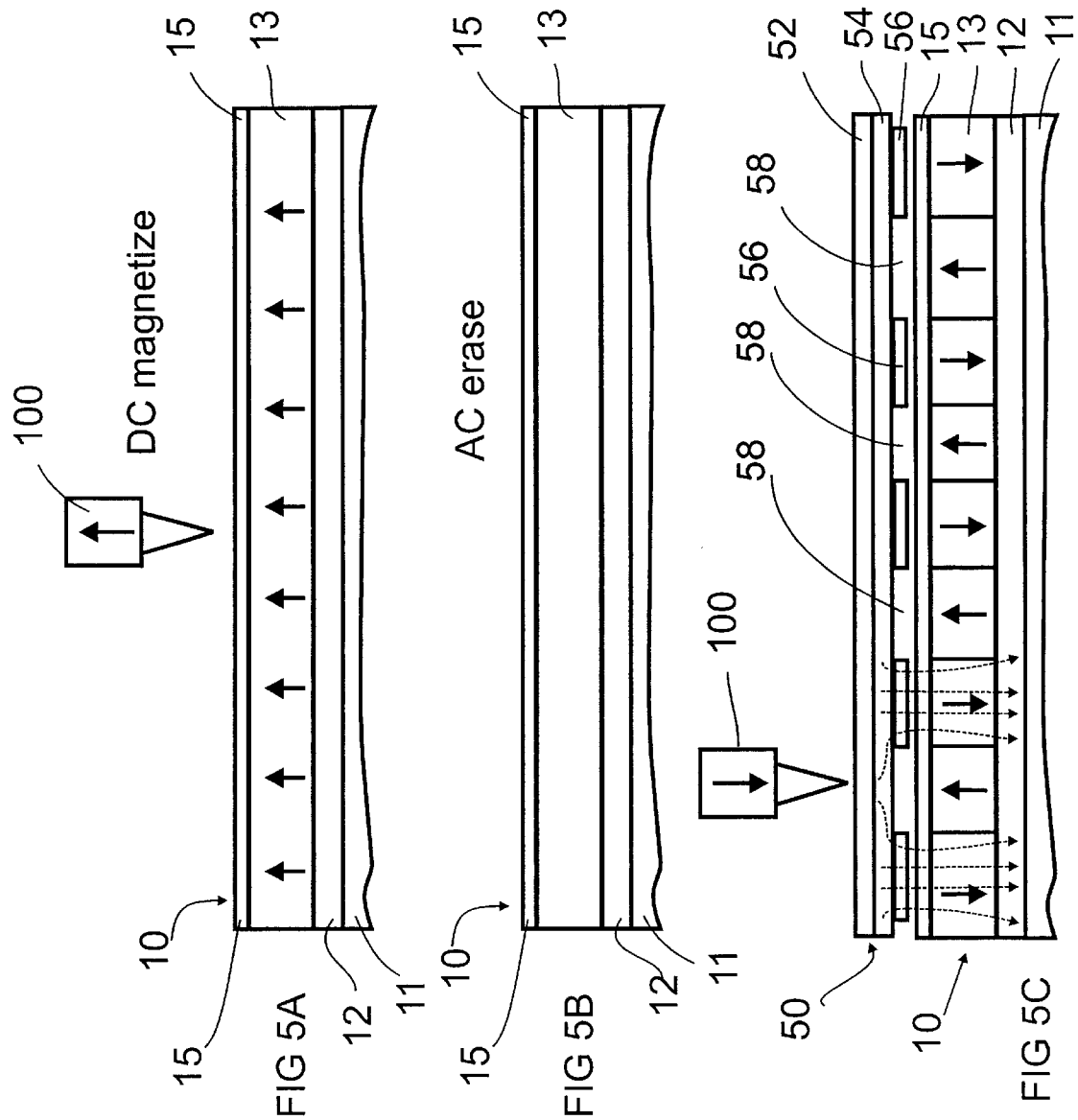

CONTACT MAGNETIC TRANSFER OF SERVO PATTERN TO RIGID PERPENDICULAR MAGNETIC RECORDING DISK

TECHNICAL FIELD

The invention relates to a method of forming a servo pattern on a rigid perpendicular magnetic recording disk, and more particularly to contacting the recording disk with a pattern on a master disk and transferring the pattern to the recording disk.

BACKGROUND OF THE INVENTION

Conventional magnetic recording hard disk drives use horizontal or longitudinal recording, i.e., the magnetized regions that define the magnetically recorded data bits are oriented in the plane of the recording layer on the rigid or hard disk. Perpendicular magnetic recording has been suggested as a promising path toward ultra-high recording densities in magnetic recording rigid disk drives. The most common type of perpendicular recording system is one that uses a single write pole or "probe" recording head with a "dual-layer" media as the recording disk. The dual-layer media has a perpendicular magnetic data recording layer with perpendicular magnetic anisotropy formed on a "soft" or relatively low-coercivity magnetically permeable underlayer, the underlayer serving as a flux return path for the field from the write pole. FIG. 1 is a schematic of such a system showing perpendicularly magnetized regions in the recording layer and a conventional magnetoresistive read element for reading the recorded data.

For both longitudinal and perpendicular magnetic recording hard disk drives, the most common method of generating the fixed, pre-recorded servo patterns that are used to position the recording head to the desired track and record location on the disk, is by "servo-writing" the patterns on a track by track basis, either with a special write head and servo-writer or with the production head in the drive. This is a time-consuming and therefore expensive process.

Contact magnetic duplication or transfer (CMT), sometimes referred to as magnetic printing, is a method of instantaneous recording of magnetic patterns onto magnetic media over large areas and has been proposed for transferring servo patterns to longitudinal magnetic recording disks in hard disk drives. The CMT method uses a "master" disk with a pattern of soft (low-coercivity) magnetic material corresponding to the servo pattern which is to be transferred to the magnetic recording disk (the "slave" disk). As shown in FIGS. 2A–2B, the slave disk is first exposed to a uniform magnetic field (i.e., "DC" magnetized) with a magnet 1 that applies an in-plane horizontal (longitudinal) magnetic field in a first direction 2 across a gap 3 between the magnet's poles, as shown in FIG. 2A. A rigid master disk supported on a carrier is then pressed into contact with the DC-magnetized slave disk, and a second horizontal DC magnetic field is applied by magnet 1 in the direction 4 opposite to the direction 2 of the first DC magnetization, as shown in FIG. 2B. This produces a magnetization pattern on the slave disk because the first magnetization on the slave disk is shielded from the second DC field in the regions where the islands 5 of soft magnetic material of the master disk are present, and the first magnetization on the slave disk is reversed in the regions beneath the openings 6 in the pattern (the regions between the soft magnetic material on the master disk), as shown by arrows 7 in FIG. 2B. The magnetic field applied to the slave disk beneath the openings 6 is enhanced by the dipole fields 8 in the soft magnetic regions adjacent the openings 6, because in the presence of the field from the magnet these regions generate their own fields. CMT was first proposed for generating servo patterns in longitudinal magnetic recording media in U.S. Pat. No. 3,869,711. Co-pending application Ser. No. 10/055,638, filed Jan. 22, 2002, and assigned to the same assignee as this application, describes a CMT process for longitudinal rigid magnetic recording disks that uses a flexible master disk and differential air pressure to place the flexible master disk into contact with the rigid slave disk.

More recently, Ishida T. et al. "Magnetic Printing Technology-Application to HDD", TMRC 2002, Paper A6, The $13^{th}$ Magnetic Recording Conference, Aug. 26–$28^{th}$, 2002, Santa Clara, Calif., has suggested that the same CMT process for longitudinal magnetic recording disks, wherein a longitudinal magnetic field is applied in the plane of the recording layer as shown in FIGS. 2A–2B, can also be applied to transfer servo patterns to perpendicular magnetic recording disks. However, a shortcoming of this approach is that it creates perpendicular field components only at the edges of features on the master disk. This limits the shape and size of magnetic patterns that can be transferred, and also has the potential to result in ill-defined boundaries in the transferred patterns.

What is needed is a CMT method for servo patterns on hard perpendicular magnetic recording disks that allows for the transfer of arbitrarily shaped magnetic patterns with sharp edge boundaries.

SUMMARY OF THE INVENTION

The invention is a contact magnetic transfer method for forming a pattern of magnetized servo regions in the magnetic recording layer of a rigid perpendicular magnetic recording disk. A master disk or template has a rigid or flexible base with a first film of soft magnetic material on the base and a pattern of islands of soft magnetic material on and extending above the first film and recesses between the islands. In one implementation, the slave disk to be servo patterned is first DC magnetized in a first direction perpendicular to the plane of the recording layer. The slave disk is then placed with its outer layer in proximity to the islands of the master template and a magnetic field is applied in a second direction opposite the DC magnetization direction. The magnetic field in the second perpendicular direction passes through the first film and islands on the master template and the regions of the recording layer beneath the islands, which causes a reversal of the magnetization in these regions. In the regions of the recording layer beneath the recesses of the template the magnetization is unchanged because the magnetic field is directed away from the spacings or air gaps in the recesses and toward the islands.

Alternatively, the slave disk to be servo patterned is first exposed to a magnetic field alternating in opposite directions (i.e., "AC erased") with an electromagnet that applies a magnetic field in alternating opposite directions perpendicular to the plane of the recording layer. After being AC erased the recording layer of the slave disk has essentially no magnetization. The slave disk is then placed with its outer layer in proximity to the islands of the master template and a magnetic field is applied in a perpendicular direction. Just as in the DC magnetized implementation, the magnetic field in the perpendicular direction passes through the first film and islands on the master template and the regions of the recording layer beneath the islands, which causes a magnetization in these regions in the same perpendicular direction as the applied field. After the applied field is removed, the magnetization in the regions of the recording layer beneath the recesses of the template spontaneously reverses in the stable state due to the closure of the magnetic flux from the magnetized regions beneath the islands.

In one embodiment the master template is flexible template and a differential gas pressure is used to press the islands against the slave disk. The master disk base is a flexible plastic film that is sealed at the outer periphery of the opening of a pressure chamber with the islands located outside the chamber. The previously DC-magnetized slave disk is brought into gentle contact with the islands and gas pressure inside the chamber is increased to slightly above atmospheric. This controlled pressure presses the islands into contact with the slave disk, at which time a magnet magnetizes the regions of the recording layer that are located beneath the islands in the perpendicular direction opposite to the original DC-magnetized direction. The magnet is located on a rotatable stage within the chamber beneath the plastic film.

For a fuller understanding of the nature and advantages of the present invention, reference should be made to the following detailed description taken together with the accompanying figures.

BRIEF DESCRIPTION OF THE DRAWING

FIGS. 2A–2B depict the prior art of contact magnetic transfer on a longitudinal magnetic recording disk.

FIGS. 3A–3B are a plan view and partial sectional view, respectively, of a hard perpendicular magnetic recording disk illustrating a pattern of servo sectors extending generally radially across an annular data band.

FIG. 4 is an expanded view of one of the servo sectors of FIG. 3A showing the servo blocks magnetized into or out of the paper.

FIG. 5A is a schematic of the DC magnetization process for the present invention.

FIG. 5B is a schematic of the AC erase process for the present invention.

FIG. 5C is a schematic of the servo patterning process for the present invention and illustrates the master template positioned on the perpendicular magnetic recording disk.

DETAILED DESCRIPTION OF THE INVENTION

Figure 1:
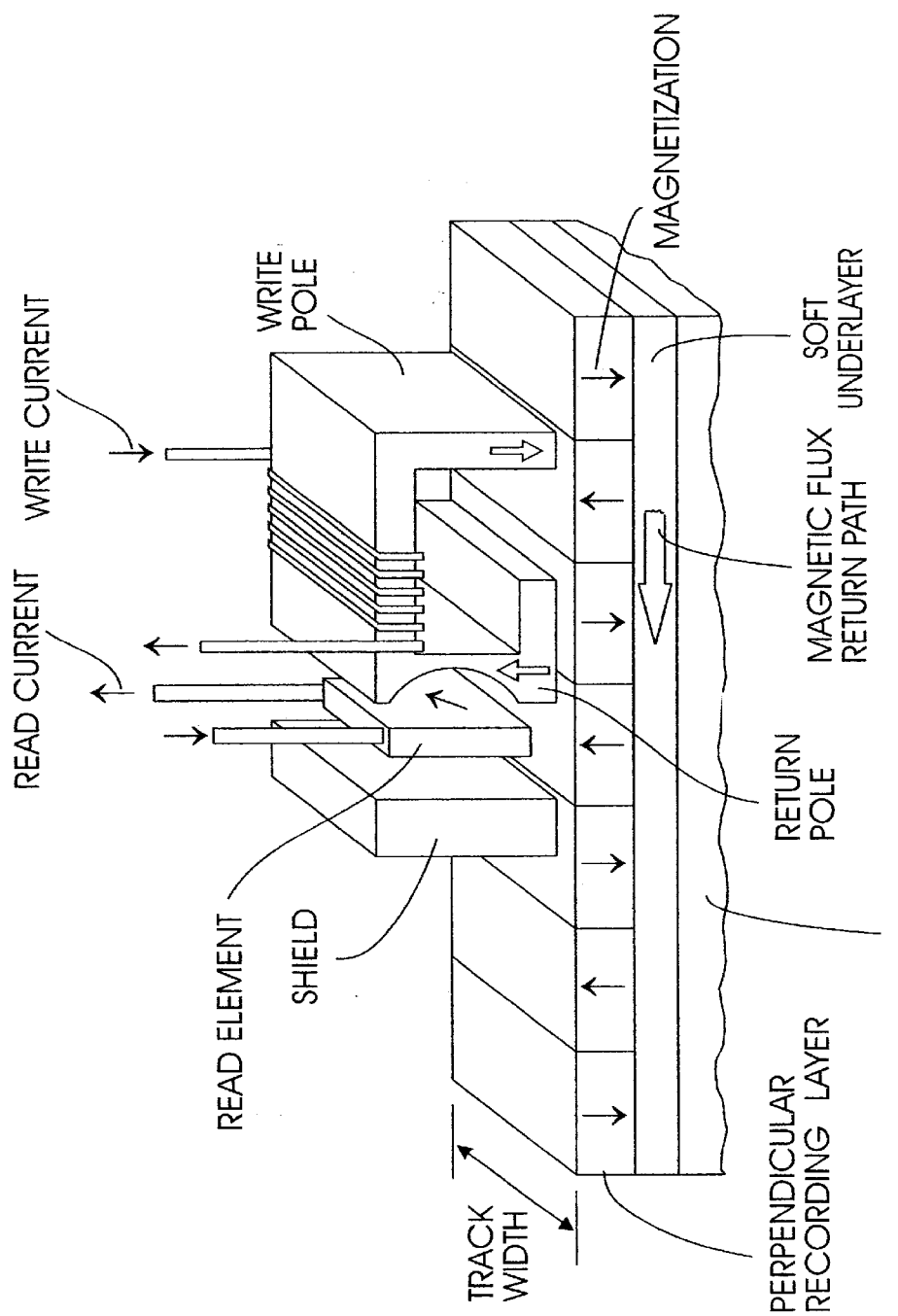
FIG. 1 is a schematic of a prior art perpendicular magnetic recording system comprising a dual-layer disk (i.e., a perpendicular magnetic data recording layer formed on a "soft" magnetically permeable underlayer), a single pole write head and a read element.

A hard perpendicular magnetic recording disk with a perpendicularly magnetized servo pattern formed by contact magnetic transfer according to the present invention is shown in the plan view FIG. 3A and the sectional view FIG. 3B. The magnetic recording disk 10 comprises a rigid substrate 11 (e.g., glass), a soft magnetic underlayer 12, a magnetic recording layer 13 having perpendicular magnetic anisotropy, and an outer layer 15 (e.g., a protective overcoat, typically amorphous "diamond-like" carbon). A lubricant, such as a perfluoropolyether (PFPE), is typically on the surface of outer layer 15. The disk 10 has an annular data portion or band which is defined by an inside diameter (ID) 14 and an outside diameter (OD) 16. Interspersed about the data band are equally angularly spaced servo sectors, such as typical servo sector 18. The servo sectors have a curved or arcuate shape from ID to OD because the read/write head in the disk drive is moved by a rotary actuator that follows an arcuate path from ID to OD. However, the servo sectors are represented as straight radial lines in FIG. 3A for ease of illustration. The sectional view of FIG. 3B is taken along the track or circumferential direction and shows substrate 11, underlayer 12 and perpendicular magnetic recording layer 13 with typical magnetized portions 48, 34, 38 making up part of the servo pattern, and outer layer 15. The magnetized portions are magnetized perpendicularly relative to the plane of the recording layer 13, i.e. either into or out of the recording layer as shown by the up and down arrows in FIG. 3B and the arrow heads and arrow tails in FIG. 4. During operation of the disk drive, the read/write head reads or writes data on a selected one of a number of concentric data tracks located between the ID 14 and OD 16 of the annular data band. To accurately read or write data from a selected track, the head is required to be maintained over the centerline of the track. Accordingly, each time one of the servo sectors, such as typical sector 18, passes beneath the head, the disk drive's head positioning control system receives servo information from the perpendicularly magnetized servo blocks contained within the servo sector. The information contained in the servo blocks generates a position error signal which is used by the head positioning control system to move the head towards the track centerline. Thus, during a complete rotation of the disk 10, the head is continually maintained over the track centerline by servo information from the servo blocks in successive servo sectors.

An expanded view of typical servo sector 18 and portions of three data tracks are illustrated in FIG. 4. The three data tracks 20, 22, 24 are shown in outline. All of the cross-hatched portions of FIG. 4 represent magnetized regions of the recording layer 13 that have been patterned by the contact magnetic transfer process according to the present invention. The arrow heads and arrow tails indicate the direction of magnetization for each magnetized region. The non-cross-hatched portions on FIG. 4 represent the regions of recording layer 13 that retain their original DC perpendicular magnetization direction if the disk was first DC magnetized, or alternatively the regions that reversed their magnetization if the disk was first AC erased. A portion of the servo sector 18 is a servo field 30 that includes spaced-apart servo blocks, such as typical servo blocks 32, 34 and 36, 38. Also included in servo sector 18 is a field 40 of radial stripes 42, 44, 46, 48 that are used to provide synchronization and gain control for the subsequently read servo signals from servo blocks 32, 34 and 36, 38. Additional information, e.g., timing marks indicating the beginning of a servo sector and/or a coded pattern for identifying the specific servo track by track number, may also be included in servo sector 18. The servo blocks 32, 34 and 36, 38 in servo field 30 and the radial stripes 42–48 in the synchronization/gain field 40 are DC magnetized perpendicularly relative to the plane of the recording layer 13, i.e. either into or out of the paper in FIG. 4.

The method for forming the servo pattern in the perpendicular magnetic recording disk according to the present invention is depicted in FIGS. 5A–5C. As shown in the first implementation in FIG. 5A, the disk 10 with recording layer 13 having perpendicular magnetic anisotropy and protective outer layer 15 is first subjected to a DC magnetic field from magnet 100. The magnet 100 may be a permanent magnet or an electromagnet. The magnet may be moved relative to the plane of recording layer 13, either by moving the magnet relative to the stationary disk, or moving the disk relative to the stationary magnet. Also, the disk 10 can be stationary and exposed to a magnetic field from a stationary magnet large enough to expose the entire area of the disk to the magnetic field. Any such method of DC magnetization results in the entire recording layer 13 being perpendicularly magnetized in a first direction perpendicular to its plane. In the alternate implementation shown in FIG. 5B, the disk 10 with recording layer 13 is AC erased by exposure to an electromagnet with a high-frequency alternating current that applies a magnetic field in alternating opposite directions perpendicular to the plane of the recording layer 13. Following AC erasure, the recording layer 13 has no perpendicular magnetization.

The master disk or template 50 is shown in sectional view in FIG. 5C and includes a base 52, a first film 54 of soft magnetic material and a plurality of islands 56 of soft magnetic material on the first film 54. The regions of the template 50 between islands 56 are shown as recesses 58. The base 52 may be rigid, such as glass and silicon, or flexible, such as a plastic sheet of polyethylene terephtalate (PET), naphtalate (PEN) or polyimide. The first film 54 of soft magnetic material is deposited on the base 52, preferably by sputtering. The soft magnetic material can be NiFe(22/78) or NiFe(32/68) or NiFeCo(35/12/53) or NiFe(55/45) or NiFeCo(55/45) or FeCo(62/38) or other alloys of Ni, Fe and/or Co. A second film of soft magnetic material that will make up the islands 56 is then deposited onto the first film 54. The second film may have a composition the same as or different from the composition of first film 54. Next a resist layer is deposited on top of the second film and then lithographically exposed and developed to form a pattern in the resist layer. The soft magnetic material in the second film is then removed using the resist pattern as an etching mask, and the resist is removed, leaving the desired pattern of islands 56 and recesses 58. If it is desired to have the first film 54 and the islands 56 be of the same soft magnetic material composition, then a single film of soft magnetic material having island regions and recessed regions between the island regions can be formed lithographically as described above, in which case the island regions will have a thickness substantially equal to the thickness of the single film.

As shown in FIG. 5C, the recording disk 10 is then positioned with its outer layer 15 in proximity (either very close or in contact) to the islands 56 of template 50. The outer layer 15 and islands 56 may be placed into contact by mechanically pressing the recording disk and the template together, or by the use of a pump to reduce the pressure between the disk and the template, thereby allowing atmospheric pressure to move the two into contact. If the disk was first DC magnetized, then the magnet 100, or a different magnet if the DC magnetization process was performed at a different location in the manufacturing line, applies a magnetic field in a second perpendicular direction opposite the first direction, to the recording layer 13. If the disk was first DC magnetized, this field may be applied in the manner described above for the DC magnetization process. As shown by the dashed field lines in FIG. 5C, the perpendicular magnetic field passes through the first film 54, the islands 56 and the regions of the recording layer 13 beneath the islands 56, which causes a reversal of the magnetization in these regions. This reversed magnetization remains after the field from magnet 100 is removed because the strength of the applied magnetic field through the regions beneath the islands 56 is greater than the coercivity of the recording layer 13. In the regions of the recording layer 13 beneath the recesses 58 the magnetization is unchanged because the magnetic field is directed away from the spacings or air gaps in the recesses 58 and toward the islands 56.

Alternatively, if the disk was first AC erased, the perpendicular magnetic field from magnet 100 passes through the first film 54, the islands 56 and the regions of the recording layer 13 beneath the islands 56, which causes a the magnetization in these regions in the same direction as the applied field (the "down" direction in FIG. 5C). When the regions of the recording layer 13 beneath the recesses 58 are exposed to the field from magnet 100 they will have the same magnetization direction as the regions beneath the islands ("down"). However, as soon as the field from magnet 100 is removed from the regions beneath the recesses, the magnetization in these regions will reverse spontaneously ("up" in FIG. 5C) due to dipole coupling from the "down" magnetized regions beneath the islands. This is because the strength of the magnetic field from magnet 100 in the regions beneath the recesses is less than the coercivity of the recording layer 13. This AC erased method is best applied to "high frequency" servo patterns, i.e., those in which the recesses 58 have relatively small dimensions along the circumferential or along-track direction. This enables the dipole coupling from the magnetized regions beneath the islands 56 to more readily reverse the magnetization in the regions beneath the recesses 58.

Figure 6:
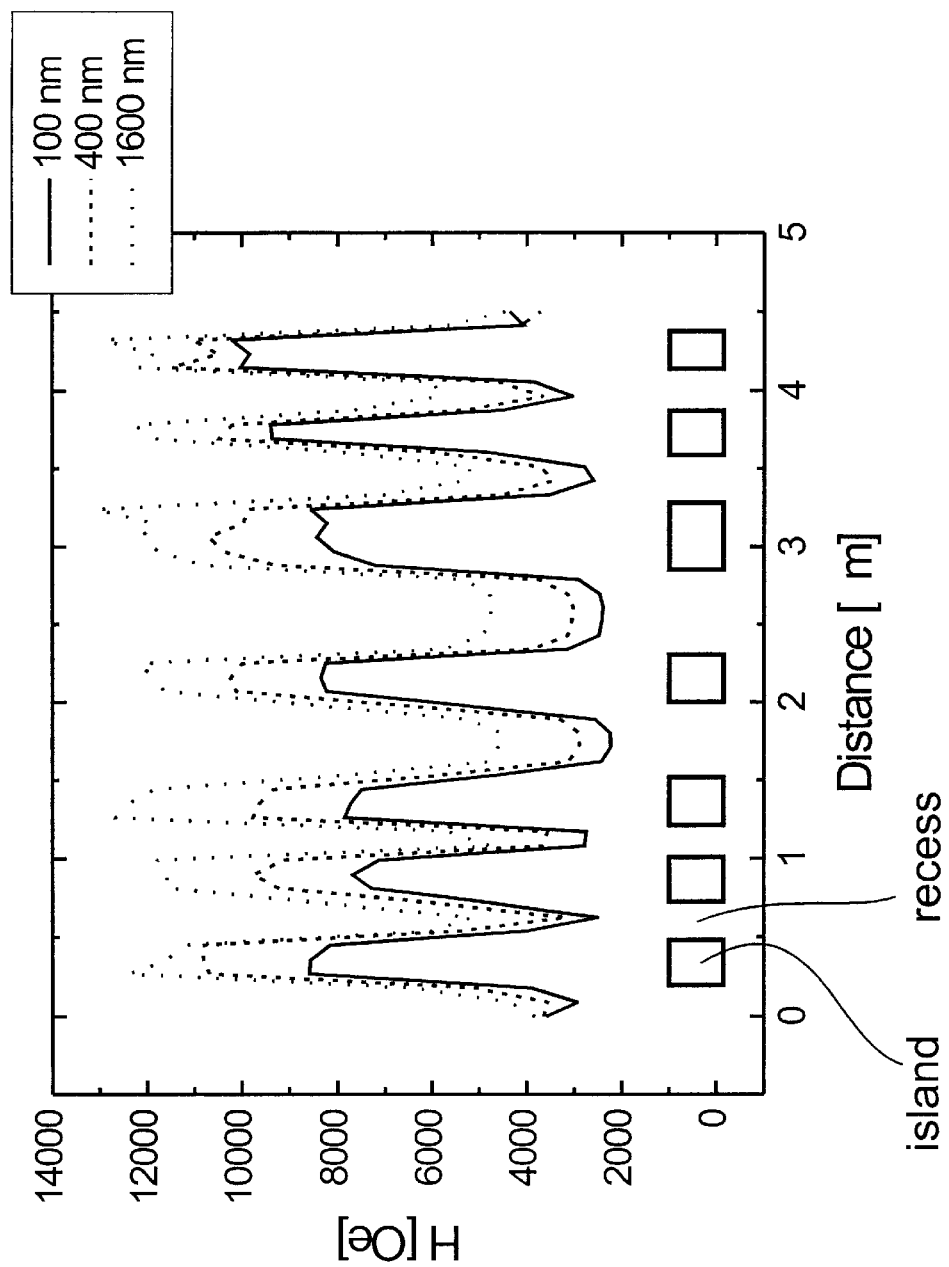
FIG. 6 is a family of graphs of the calculated magnetic field just below the island regions and recess regions of the master template for various thicknesses of the first film in the template.

It is important to assure that all of the regions of the recording layer 13 of the recording disk beneath the patterned islands 56 of the master template 50 are magnetized, and that none of the other regions of the recording layer 13 are magnetized. This is accomplished by proper selection of the strength of the field from the magnet 100, and the thicknesses and material composition for the first film 54 and islands 56. The thickness of the islands 56 determines the thickness of the spacing between the first film 54 and the recording layer 13 in the recesses 58. Typical examples of these parameters are 80–160 nm for thickness of the islands 56, and 400–1600 nm for the thickness of film 54. FIG. 6 is a family of graphs of the calculated magnetic field just below the island regions and recess regions for various thicknesses of the first film in the template. For this data, the first film 54 was NiFe (1.1 Tesla) and the islands 56 were FeCo (2.2 Tesla) with a thickness of 160 nm. The valleys in the family of curves correspond to the calculated field beneath the recesses 58 in the template. FIG. 6 shows that an increase in thickness of film 54 leads to increased contrast obtained between peaks in the curves (corresponding to the field beneath the islands) and valleys in the curves (corresponding to the field beneath the recesses). If the value of the field beneath the recesses is smaller than the magnetic coercivity of the recording layer 13, and if the value of the field beneath the islands is larger than the coercivity of the layer 13, then the pattern from the template 50 will transfer to the magnetic recording layer 13.

Figure 7:
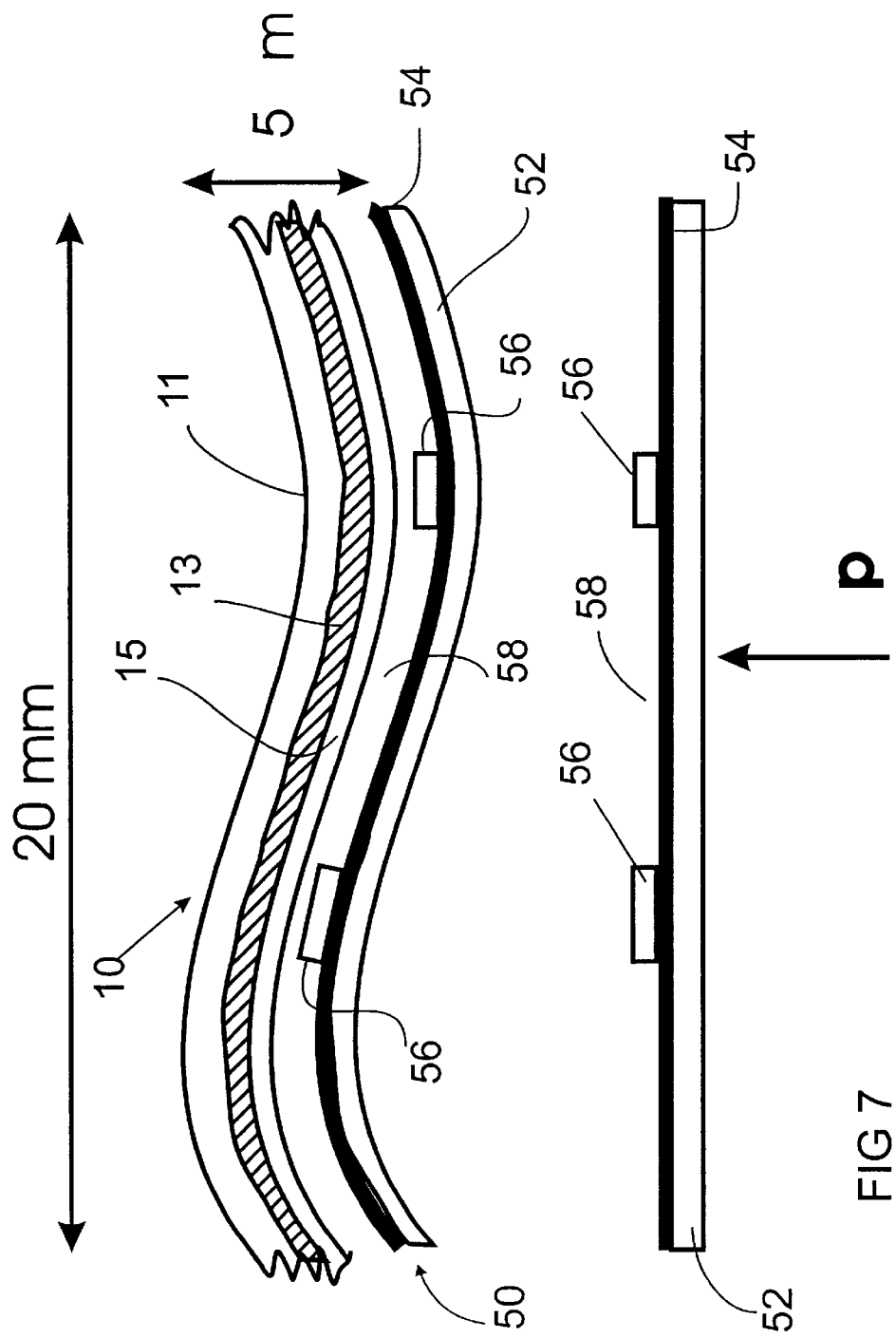
FIG. 7 is an illustration of the method of contacting the perpendicular recording disk with the pattern of islands by using a flexible sheet to conform to the curvature of the disk.

Positioning the recording disk with its outer layer in proximity to islands of the master template is difficult because the recording disk is not flat, but rather can exhibit a curvature with a peak-to-peak variation in the axial direction (perpendicular to the disk surface) of 5 microns over a 20 mm range or period and 0.25 microns over a 4 mm period. For this reason it is preferable to use a flexible master template with a flexible sheet as the base, and differential gas pressure to place the outer layer of the recording disk into contact with the islands. This is depicted in FIG. 7, where the master template 50 has a flexible sheet as the base 52, and a small differential gas pressure ΔP is applied to the flexible sheet to press the islands 56 into contact with the outer layer 15 of the recording disk 10 so that the master template 50 has substantially the same curvature as the recording disk 10.

Figure 8B:
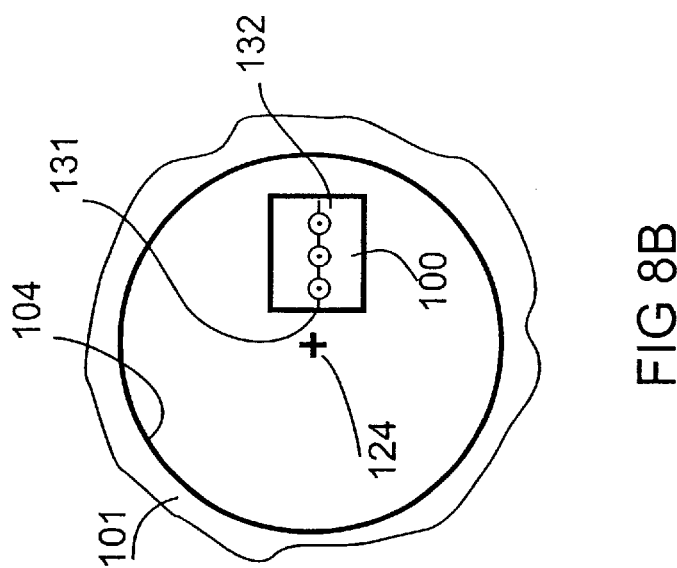
FIGS. 8A–8B are side sectional and top views, respectively, of the apparatus used in the method of the present invention.
Figure 8A:
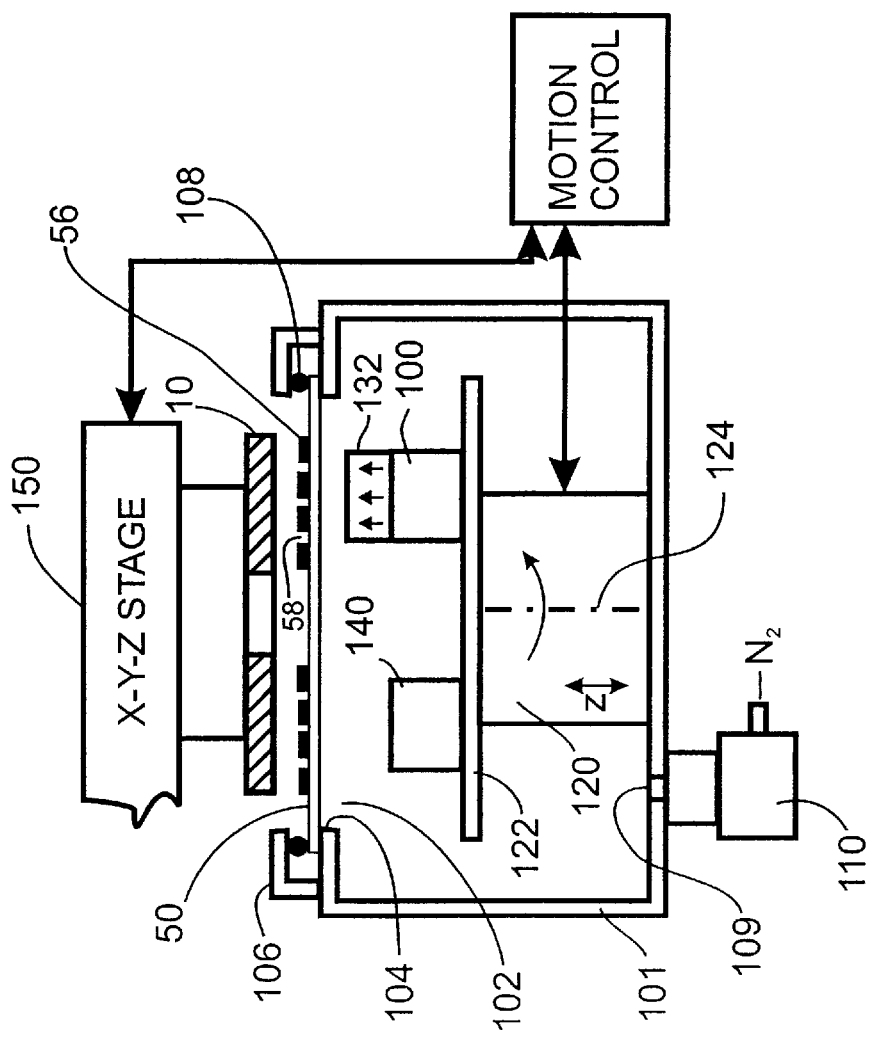

The apparatus for CMT using the flexible template and differential gas pressure is shown in FIGS. 8A–8B. A chamber 101 has an upper opening 102 with an outer periphery 104. The opening 102 is covered by flexible template 50 with patterned islands 56 and recesses 58. The chamber opening 102 is sealed by clamp 106 and O-ring 108. The interior of chamber 101 has an inlet 109 connected to pressure regulator 110 which is connected to a pressurized nitrogen source. A rotation stage 120 is located inside chamber 101 and supports a platform 122 that rotates about an axis 124. A permanent magnet 100 and a counterweight 140 for magnet 100 are mounted off-axis on the platform 122. As shown in the top view of FIG. 7B with the template 50 removed, the magnet 100 has its field lines 132 oriented out of the paper so that the recording disk will be magnetized in a direction perpendicular to the plane of its recording layer. The stage 120 is also movable in the vertical Z-direction parallel to the axis 124 so that magnet 100 can be positioned at the desired distance from template 50. The recording disk 10 to be patterned is mounted on a gripper arm 150 that is movable in the X-Y-Z directions above the template 50. The movement of the gripper arm 150 and stage 120 is controlled by a motion controller, typically a PC.

To begin the CMT of the servo patterns to the recording disk 10 the previously DC-magnetized disk 10 (or previously AC-erased disk 10) is positioned and centered over template 50 by movable gripper arm 150. In this example the disk 10 has been DC magnetized in a first perpendicular direction down and facing template 50 in FIG. 8A (opposite to arrows 132) in a separate manufacturing station. The disk 10 is positioned in the Z-direction so that its outer surface gently touches the pattern islands 56 on template 50. Next, the pressure regulator 110 is used to increase the pressure within chamber 100 slightly above atmospheric to move the template 50 outward so that the islands 56 are pressed into contact with the outer surface of disk 10. While initial gentle contact of the outer surface of the disk 10 with the islands 56 is preferred, the disk 10 can be positioned to be very close, but not in contact, or in only partial contact with some of the islands, so long as the disk is close enough that the pressure differential moves the islands 56 to press them into full contact. The pressure within the chamber 101 and the flexibility of the sheet allows the islands 56 to follow the contour of the outer surface of the disk 10. The magnet 100 is moved in the Z-direction to the desired distance from template 50. This distance depends on the field strength of magnet 100, the thickness of the template 50, the material and thickness of the patterned islands 56 and the material in the recording layer of disk 10. For example, if the magnet is a 10 MGOe (mega Gauss-Oersted) NiFeB permanent magnet with magnetic field perpendicular to the plane of disk 10, and the plastic sheet is a 25 micron thick polyimide film with 160 nm thick pattern islands formed of $Ni_{32}Fe_{68}$, then this distance is selected to be between 0.1 and 0.3 mm. The stage 120 is then rotated and the magnet 100 applies the field 132 to the annular data band on the disk 10. This reverses the magnetization in the annular data band in those regions of the recording layer that are beneath the islands 56 on the template 50 (or induces the magnetization beneath the islands 56 if the recording layer was initially AC-erased). This results in just those regions of the recording layer beneath the recesses 58 remaining DC-magnetized in the first perpendicular direction (or reversing spontaneously after removal of the field from magnet 100 if the disk was initially AC-erased).

The process has been described with a recording disk that was previously DC-magnetized in one direction. However, the disk can be DC-magnetized in the apparatus of FIGS. 8A–8B if the permanent magnet is replaced with an electromagnet. In this case, after the disk 10 has been positioned over but not in contact with the islands 56 on template 50, the electromagnet is positioned beneath the template 50 and current is applied to the electromagnet to generate a field in the direction opposite the direction of arrows 132 (FIG. 8B). The stage 120 is rotated and because the pattern islands 56 are not in contact with the outer layer of disk 10 the field from the electromagnet magnetizes all of the disk, even those regions directly opposite but not in contact with the recesses 58. The process then proceeds as described previously, except that current is applied to the electromagnet in the opposite direction so that the field is applied to the disk in the direction of arrows 132. Also, if the disk 10 is to be first AC-erased this can also be done in the apparatus of FIGS. 8A–8B with an electromagnet.

The flexible sheet for the base is preferably a plastic film, such as PET, PEN or polyimide, with thickness in the range between 5 and 200 microns. Commercially available films suitable for the plastic sheet include Melinex 453, Melinex 725, Melinex 561, Mylar D1, and Kadanex 1000, all available from DuPont, and spin-coated polyimide films available from HD MicroSystems. The pressure difference is applied to the template 50 to control the degree of the contact of the islands 56 with the outer layer 15 of the recording disk 10. It was found that a pressure in the range of between 0.1 psi and 1.5 psi above atmospheric can be used to successfully achieve contact. The pressure required to achieve contact depends on the period of curvature of the recording disk surface and the thickness and stiffness of the flexible sheet.

The objective of the fabrication of the flexible sheet with the pattern islands is to produce a mechanically stable, durable master disk that can be used many times. In one method of fabrication of the plastic sheet, a polyimide solution is spin-coated onto a conventional single-crystal silicon wafer and then cured at high temperature. The cured polyimide film can then be physically removed from the wafer, or the central portion of the wafer can be removed by etching from the side opposite the polyimide film, leaving the polyimide film attached to and supported by the outer silicon ring that remains after etching. In an alternative method of fabrication of the plastic sheet, a thin plastic film of PET or PEN material is attached to a rigid substrate using an adhesive applied to one side of the plastic film. The plastic film is attached to the substrate only during the fabrication process. The adhesive may be an ultraviolet light detachable adhesive, so that if a transparent substrate (such as glass) is used, release of the plastic film from the substrate at the end of the fabrication process is achieved by irradiation with ultraviolet light through the substrate.

A thin protective coating, such as plasma-polymerized 2.5 nm thick perfluorocarbon (PFC) film, can be applied over the surface of the plastic sheet and the pattern islands to improve durability and reduce water contamination.

The invention has been described with respect to a conventional magnetic recording disk that has an outer layer in the form of a protective overcoat. However, "overcoatless" magnetic recording disks have been proposed but are not yet commercially available. Such disks will have a magnetic recording layer that is hard enough to not require a protective overcoat. The present invention is fully applicable to such overcoatless disks. Thus for the purpose of this invention and as described in the claims the term "outer layer" shall also mean the upper surface of the recording layer in such overcoatless disks, so that a disk having a recording layer and an outer layer on the recording layer shall also mean an overcoatless disk having a recording layer with an upper surface.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method of forming a pattern of perpendicularly magnetized regions in a rigid disk magnetic recording layer having perpendicular magnetic anisotropy, the method comprising:

providing a magnetic recording disk comprising a rigid substrate, a magnetic recording layer on the substrate, and an outer layer on the recording layer;

providing a master template comprising a base, a first film of soft magnetic material on the base, and a plurality of islands of soft magnetic material located on and extending above the first film;

positioning the recording disk with the outer layer proximate the islands on the master template; and generating a magnetic field perpendicular to the plane of the recording layer to magnetize the regions of the recording layer beneath the regions of the outer layer that are proximate the islands on the master template in the same direction as the generated magnetic field.

2. The method of claim 1 wherein providing a magnetic recording disk comprises providing a magnetic recording disk having an AC erased magnetic recording layer, wherein following generation of the magnetic field the regions of the recording layer not beneath the regions of the outer layer that are proximate the islands on the master template become magnetized in a perpendicular direction opposite the direction of the generated magnetic field.

3. The method of claim 1 wherein providing a magnetic recording disk comprises providing a magnetic recording disk having a magnetic recording layer on the substrate having a portion magnetized in a first direction perpendicular to the plane of the recording layer, and wherein generating a magnetic field comprises generating a magnetic field in a second perpendicular direction opposite to said first direction.

4. A method of forming a pattern of perpendicularly magnetized regions in a rigid disk magnetic recording layer having perpendicular magnetic anisotropy, the method comprising:

providing a magnetic recording disk comprising a rigid substrate, a magnetic recording layer on the substrate having a portion magnetized in a first direction perpendicular to the plane of the recording layer, and an outer layer on the recording layer;

providing a master template comprising a base, a first film of soft magnetic material on the base, and a plurality of islands of soft magnetic material located on and extending above the first film;

positioning the recording disk with the outer layer proximate the islands on the master template; and generating a magnetic field perpendicular to the plane of the recording layer in a second direction opposite to said first direction to reverse the magnetization direction of the regions of the recording layer beneath the regions of the outer layer that are proximate the islands on the master template.

5. The method of claim 4 wherein providing a magnetic recording disk comprises magnetizing the portion of the recording layer in said first perpendicular direction.

6. The method of claim 5 wherein magnetizing the portion of the recording layer in said first perpendicular direction comprises applying electrical current to an electromagnet in one direction, and wherein generating a magnetic field in said second perpendicular direction comprises reversing the direction of electrical current to the electromagnet.

7. The method of claim 5 wherein magnetizing the portion of the recording layer in said first perpendicular direction comprises applying a magnetic field from a permanent magnet.

8. The method of claim 4 wherein generating a magnetic field in the second perpendicular direction comprises applying a magnetic field from a permanent magnet.

9. The method of claim 4 wherein generating a magnetic field in the second perpendicular direction comprises moving the magnetic field relative to the recording layer in a direction generally parallel to the plane of the recording layer.

10. The method of claim 4 wherein said portion of the magnetic recording layer magnetized in a first direction is substantially all of said magnetic recording layer.

11. The method of claim 4 wherein positioning the recording disk with the outer layer proximate the islands on the master template comprises placing the outer layer in contact with the islands.

12. The method of claim 4 wherein the base is a flexible sheet.

13. The method of claim 12 wherein positioning the recording disk with the outer layer proximate the islands on the master template comprises applying a differential gas pressure to the flexible sheet to press the islands against the outer layer of the recording disk.

14. The method of claim 13 wherein applying the differential gas pressure comprises applying a pressure difference between the two surfaces of the flexible sheet in a range between 0.1 and 1.5 psi.

15. The method of claim 13 further comprising providing a chamber having an opening with an outer perimeter, sealing the perimeter of the chamber opening with the outer periphery of the flexible sheet with the islands located outside the chamber, and wherein applying a differential gas pressure to the flexible sheet comprises pressurizing the sealed chamber.

16. The method of claim 12 wherein the flexible sheet is a plastic film having a thickness in the range of 20 to 200 microns.

17. The method of claim 12 wherein the flexible sheet is a plastic film formed of a material selected from the group consisting of polyethylene terephtalate, polyethylene naphtalate and polyimide.

18. The method of claim 4 wherein the soft magnetic material magnetic in the first film is a low-coercivity magnetic material comprising an alloy of one or more of Ni, Fe and Co.

19. The method of claim 4 wherein the soft magnetic material magnetic in the islands is a low-coercivity magnetic material comprising an alloy of one or more of Ni, Fe and Co.

20. The method of claim 4 wherein providing a master template comprising a first film of soft magnetic material and a plurality of islands of soft magnetic material located on and extending above the first film comprises providing a master template having a single film of soft magnetic material with island regions and recessed regions between the island regions, the island regions having a thickness substantially equal to the thickness of said single film.

21. A contact magnetic transfer method of forming a pattern of magnetized servo regions in the magnetic recording layer of a rigid perpendicular magnetic recording disk comprising:

providing a magnetic recording disk comprising a rigid substrate, a soft magnetic underlayer on the substrate, a magnetic recording layer on the underlayer having a portion magnetized in a first direction perpendicular to the plane of the recording layer, and an outer layer on the recording layer;

providing a master template comprising a flexible sheet, a first film of soft magnetic material on the flexible sheet, and a plurality of islands of soft magnetic material located on and extending above the first film;

providing a chamber having an opening with an outer perimeter;

sealing the perimeter of the chamber opening with the outer periphery of the flexible sheet with the islands located outside the chamber;

positioning the recording disk with the outer layer facing the islands on the flexible sheet;

pressurizing the chamber above atmospheric pressure to flex the flexible sheet and press the islands into contact with the outer layer of the recording disk; and generating a magnetic field perpendicular to the plane of the recording layer in a second direction opposite said first direction to reverse the magnetization direction of the regions of the recording layer beneath the regions of the outer layer that are in contact with the islands on the master template.

22. The method of claim 21 wherein generating a magnetic field in the second perpendicular direction comprises moving the magnetic field relative to the recording layer in a direction generally parallel to the plane of the recording layer.

23. The method of claim 22 wherein moving the magnetic field comprises moving the magnetic field in a circular path around the disk.

24. The method of claim 23 wherein moving the magnetic field in a circular path comprises locating a permanent magnet on a rotatable stage within the chamber, the magnetic filed form the permanent magnet extending in a direction generally parallel to the axis of rotation of the rotatable stage.

25. The method of claim 21 wherein the magnet is an electromagnet, wherein providing the recording disk comprises magnetizing the recording layer in the first perpendicular direction by applying electrical current to the electromagnet in a first direction and moving the magnet in a circular path around the disk, and wherein generating a magnetic field having a direction opposite to said first perpendicular direction of magnetization comprises reversing the direction of electrical current to the electromagnet.

26. The method of claim 21 wherein pressurizing the sealed chamber comprises pressurizing the chamber to between 0.1 and 1.5 psi above atmospheric pressure.

27. The method of claim 21 wherein the flexible sheet is a plastic film having a thickness in the range of 20 to 200 microns.

28. The method of claim 21 wherein the flexible sheet is a plastic film formed of a material selected from the group consisting of polyethylene terephtalate, polyethylene naphtalate and polyimide.

29. The method of claim 21 wherein the soft magnetic material magnetic in the first film is a low-coercivity magnetic material comprising an alloy of one or more of Ni, Fe and Co.

30. The method of claim 21 wherein the soft magnetic material magnetic in the islands is a low-coercivity magnetic material comprising an alloy of one or more of Ni, Fe and Co.

31. The method of claim 21 wherein providing a master template having a first film of soft magnetic material and a plurality of islands of soft magnetic material located on and extending above the first film comprises providing a master template having a single film of soft magnetic material with island regions and recessed regions between the island regions, the island regions having a thickness substantially equal to the thickness of said single film.

* * * * *

UNITED STATES PATENT AND TRADEMARK OFFICE
CERTIFICATE OF CORRECTION

PATENT NO. : 6,791,774 B1
APPLICATION NO. : 10/436932
DATED : September 14, 2004
INVENTOR(S) : Albrecht et al.

It is certified that error appears in the above-identified patent and that said Letters Patent is hereby corrected as shown below:

In column 12, claim 24, line 7 change "filed" to --field--

Signed and Sealed this

Eighth Day of April, 2008

JON W. DUDAS
*Director of the United States Patent and Trademark Office*